United States Patent [19]
Ohara et al.

[11] Patent Number: 5,282,062
[45] Date of Patent: Jan. 25, 1994

[54] FACSIMILE DATA PROCESSING APPARATUS

[75] Inventors: Kiyotaka Ohara, Nagoya; Satoshi Okimoto, Komaki; Takao Seki; Hifumi Kato, both of Nagoya, all of Japan

[73] Assignee: Brother Kogyo Kabushiki Kaisha, Nagoya, Japan

[21] Appl. No.: 813,764

[22] Filed: Dec. 27, 1991

[30] Foreign Application Priority Data

Dec. 27, 1990 [JP] Japan .................................. 2-415272

[51] Int. Cl.$^5$ .............................................. H04N 1/40
[52] U.S. Cl. .................................... 358/470; 358/467; 358/431
[58] Field of Search ............... 358/400, 401, 403, 405, 358/407, 426, 261.1, 261.2, 261.3, 261.4, 262.1, 430, 431, 434, 435, 436, 442, 443, 445, 447, 448, 467, 468

[56] References Cited

U.S. PATENT DOCUMENTS

| | | | |
|---|---|---|---|
| 4,297,727 | 10/1981 | Ogawa et al. | 358/261.4 |
| 4,527,252 | 7/1985 | Donohue et al. | 395/110 |
| 4,901,248 | 2/1990 | Ueno et al. | 395/110 |

FOREIGN PATENT DOCUMENTS

| | | | |
|---|---|---|---|
| 62-204955 | 9/1987 | Japan | G06F 3/12 |
| 63-46628 | 9/1988 | Japan | H04N 1/00 |

*Primary Examiner*—Edward L. Coles, Sr.
*Assistant Examiner*—Jerome Grant, II
*Attorney, Agent, or Firm*—Oliff & Berridge

[57] ABSTRACT

In a facsimile data processing apparatus, printer code, including a line pitch amount control command and character codes are received from a host computer. The character codes are converted into image data and the image data is converted into transmission code such as modified Huffman code. The line space is directly converted into the transmission code, in the form of white code, without the conversion into image data. The line space varies according to the line pitch amount control command by changing the amount of the white code to be added.

10 Claims, 8 Drawing Sheets

Fig.2B

| ITEM | INSTRUCTIONS |
|---|---|
| S1 | INITIALIZE IMAGE VERTICAL POSITION DATA AREA<br>INITIALIZE MH CODING VERTICAL POSITION DATA AREA<br>INITIALIZE PAGE LENGTH DATA AREA<br>INITIALIZE LINE PITCH AMOUNT DATA AREA |
| S2 | IMAGING PROCESS FOR ONE LINE |
| S3 | CONCLUSION INFORMATION FOR ONE LINE IS "1"? |
| S4 | STORE RTC IN MH CODING DATA BUFFER AREA |
| S5 | MHY < IMGY |
| S6 | INITIALIZE COUNTER C(=0) |
| S7 | C < 28 |
| S8 | CONVERT Cth RASTER OF IMAGE DATA INTO MH CODE |
| S9 | C=C+1 |
| S10 | MHY=MHY+28 |
| S11 | STORE WHITE CODE (RUN LENGTH 1728) IN MH CODE DATA BUFFER AREA |
| S12 | MHY=MHY+1 |

Fig.3B

| ITEM | INSTRUCTIONS |
|---|---|
| S13 | INITIALIZE IMAGE DATA BUFFER AREA<br>INITIALIZE HORIZONTAL POSITION DATA AREA(CPX) |
| S14 | READ A CODE FROM RECEIVED DATA BUFFER AREA |
| S15 | PAGE FEED OR LINE FEED? |
| S16 | ADVANCE READ POINTER OF RECEIVED DATA BUFFER AREA |
| S17 | LINE PITCH AMOUNT CONTROL COMMAND"1"? |
| S18 | LINE=32 |
| S19 | LINE PITCH AMOUNT CONTROL COMMAND "2"? |
| S20 | LINE=48 |
| S21 | CONVERT CHARACTER CODE INTO IMAGE DATA |
| S22 | CPX=CPX+1 |

Fig.4B

| ITEM | INSTRUCTIONS |
|---|---|
| S23 | CPX=0 |
| S24 | ADVANCE READ POINTER OF RECEIVED DATA BUFFER AREA |
| S25 | PAGE FEED? |
| S26 | IMGY=IMGY+LINE |
| S27 | IMGY+32>PAGE? |
| S28 | CONCLUDE MAKING THE CONCLUSION INFORMATION"0" |
| S29 | CONCLUDE MAKING THE CONCLUSION INFORMATION"1" |

FACSIMILE DATA PROCESSING APPARATUS

BACKGROUND OF THE INVENTION

1. Field of the Invention

The invention relates to a facsimile data processing apparatus which converts image data, corresponding to character codes output from a host computer, into a transmission code, such as modified Huffman code, and outputs the converted code.

2. Description of Related Art

A facsimile data processing apparatus, which is connected to a host computer within a host computer apparatus or from outside of the host computer apparatus, outputs modified Huffman (MH) codes to telephone lines by converting characters corresponding to character data, outputted from the host computer, into image data and converting the image data into MH codes.

Therefore, a conventional facsimile data processing apparatus converts strings of characters, which correspond to inputted character code, into image data by using font patterns stored in a character font pattern memory; converts the converted image data into MH codes; and outputs the MH codes with modulation.

In the conventional facsimile data apparatus as described above, when data read from the character font pattern memory, corresponding to character codes, is converted into several lines of image data, line spaces have been formed by the methods as follows. Namely, in one method, space dot data is provided at the upper and lower portion of character data, which are represented by dot matrix data, stored in a character font pattern memory, and the sum of an upper space and a lower space associated with each character produce the line space. In another method, space lines composed of full space image data have been inserted separately.

In the described methods, however, it is necessary for the character font pattern memory to include space data to produce line space, and, therefore, there is a problem that the memory capacity becomes large. According to both of the above methods, the line pitch is predetermined but there is a problem in that the line pitch can neither be set freely nor be set delicately. Also, it is necessary for both methods to convert the image data for the line space, as well as the character data, into MH code, therefore, there is a problem that the converting

SUMMARY OF THE INVENTION

Accordingly, it is an object of the present invention to provide a facsimile data processing apparatus in which the required memory capacity of a character font pattern memory can be reduced.

Another object of the present invention is to provide a facsimile data processing apparatus in which a great variety of line spaces can be inserted.

A further object of the present invention is to provide a facsimile data processing apparatus in which the converting time from image data into code can be reduced.

According to the present invention, there is provided a facsimile data processing apparatus comprising: first conversion means for receiving printer control code and character code and for converting characters corresponding to the received character code into image data; second conversion means for converting the converted image data into transmission code; memory means for memorizing line space amount; and code adding means for adding white code, corresponding to the line space amount stored in the memory means, following said transmission code converted from the image data of one character line.

According to the above structure, white code corresponding to the line space, which is not converted into image data, is added following the code converted from image data of one character line. Therefore, it is not necessary for the character font pattern memory to have the capacity for the line spaces, which conventionally have been provided in the memory. Also, the conversion time from image data, for the line space, into the code is not necessary, since the white code is added directly without the conversion into the code for the line space.

BRIEF DESCRIPTION OF THE DRAWINGS

The above and other objects, features and advantages of the invention will become more apparent from reading the following description of the preferred embodiment taken in connection with the accompanying drawings in which:

FIGS. 2A and 2B are a flow chart and a table of labels showing a conversion routine into modified Huffman code for one page;

FIGS. 3B and 4B are tables of labels for FIGS. 3A and 3B respectively; and

DETAILED DESCRIPTION OF THE PREFERRED EMBODIMENT

Referring to the accompanying drawings, an embodiment of the present invention will be explained hereinafter. Although the modified Huffman (hereinafter, referred to as MH) coding method is employed as a coding method for image data in this embodiment, the coding method is not limited thereto.

Figure 1:
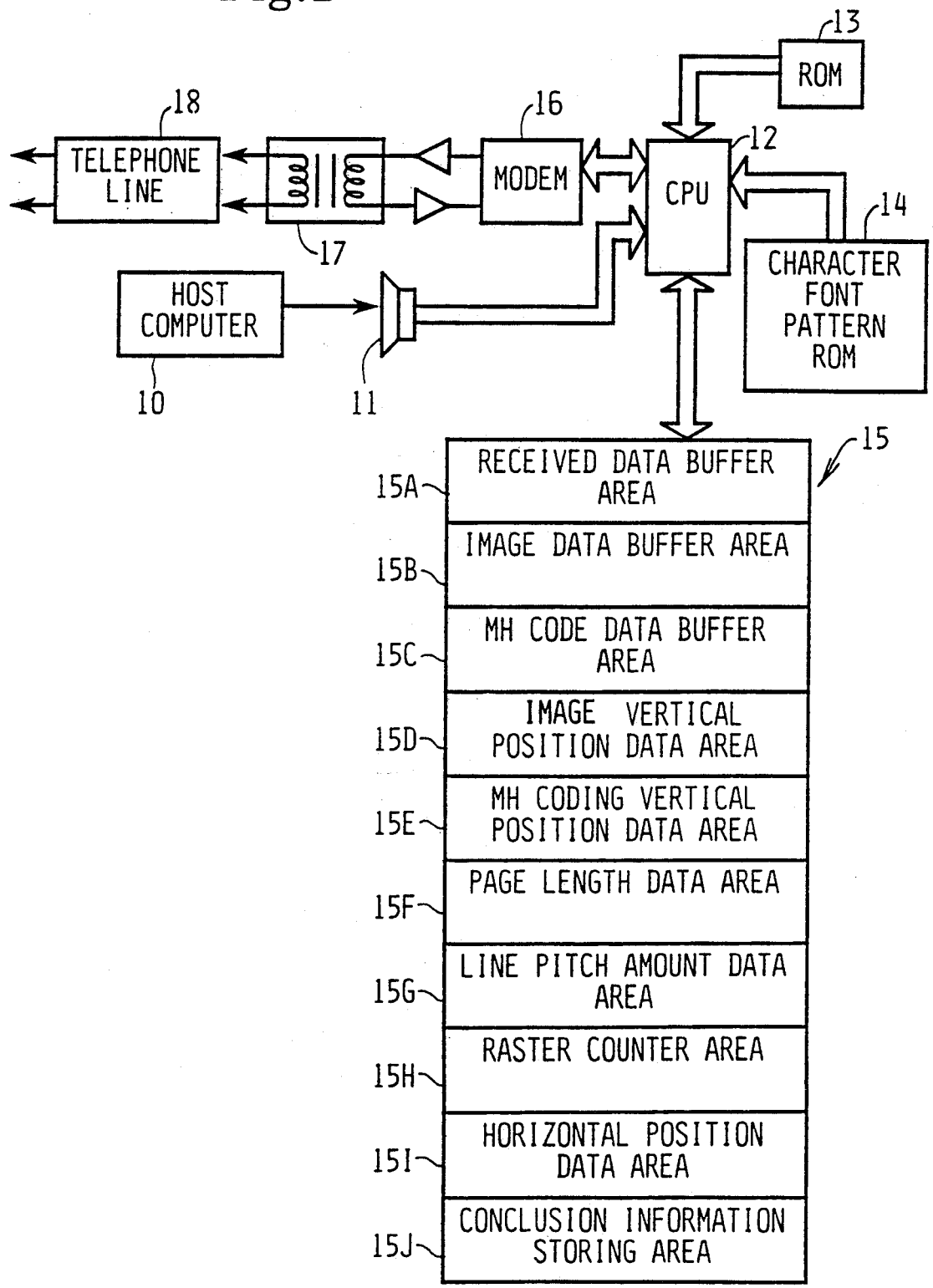
FIG. 1 is a block diagram showing a facsimile data processing apparatus according to the present invention and some peripheral devices.

FIG. 1 is a block diagram which shows the configuration of this embodiment. Character codes and control codes, including printer control codes, from a host computer 10 are input into a central processing unit (CPU) 12 through serial interface connecter 11. The facsimile data processing apparatus of this embodiment includes the CPU 12, a ROM 13 in which programs are stored, a character font pattern ROM 14, and a RAM 15. The CPU 12, ROM 13, character font pattern ROM 14, and RAM 15 operate together according to the program stored in the ROM 13 and constitute a microcomputer to control the facsimile data processing apparatus.

The RAM 15 includes; a received data buffer area 15A for storing character codes and control codes, including printer control codes, received through the serial interface connecter 11; an image data buffer area 15B in which image data, converted from character codes by using the character font pattern ROM 14, is stored; an MH code data buffer area 15C in which transmission code data, which in this embodiment is MH code data, converted from image data being stored in the image data buffer area 15B, is stored; an image vertical position data area 15D in which a vertical uppermost raster position of the one line image data, which should be subjected to a conversion into MH code, is stored; an MH coding vertical position data area 15E in which a vertical raster position of image data, which should be subjected to the conversion into MH code at the next time, is stored; a page length data area 15F in which a page length, representing a vertical size of one page, represented by the number of rasters is stored; a line pitch amount data area 15G in which a line pitch represented by the number of rasters is stored; a raster counter area 15H to count the number of rasters; a horizontal position data area 15I in which an emulated horizontal position of an impact printer head is stored as a variable; and a conclusion information storing area 15J in which conclusion information, which shows the conclusion status of the conversion into image data of one line or the one page, is stored.

The variable, designated CPX, stored in the horizontal position data area 15I varies by receiving emulated printer control codes accompanying a horizontal movement of the impact printer head, such as a space code and character codes.

The MH code data stored in the MH code data buffer area 15C is supplied to a modem 16 and is modulated thereby. The modulated output is supplied to a telephone line 18 through a mesh control unit 17 and then is supplied to a receiving facsimile apparatus (not shown).

Figure 3A:
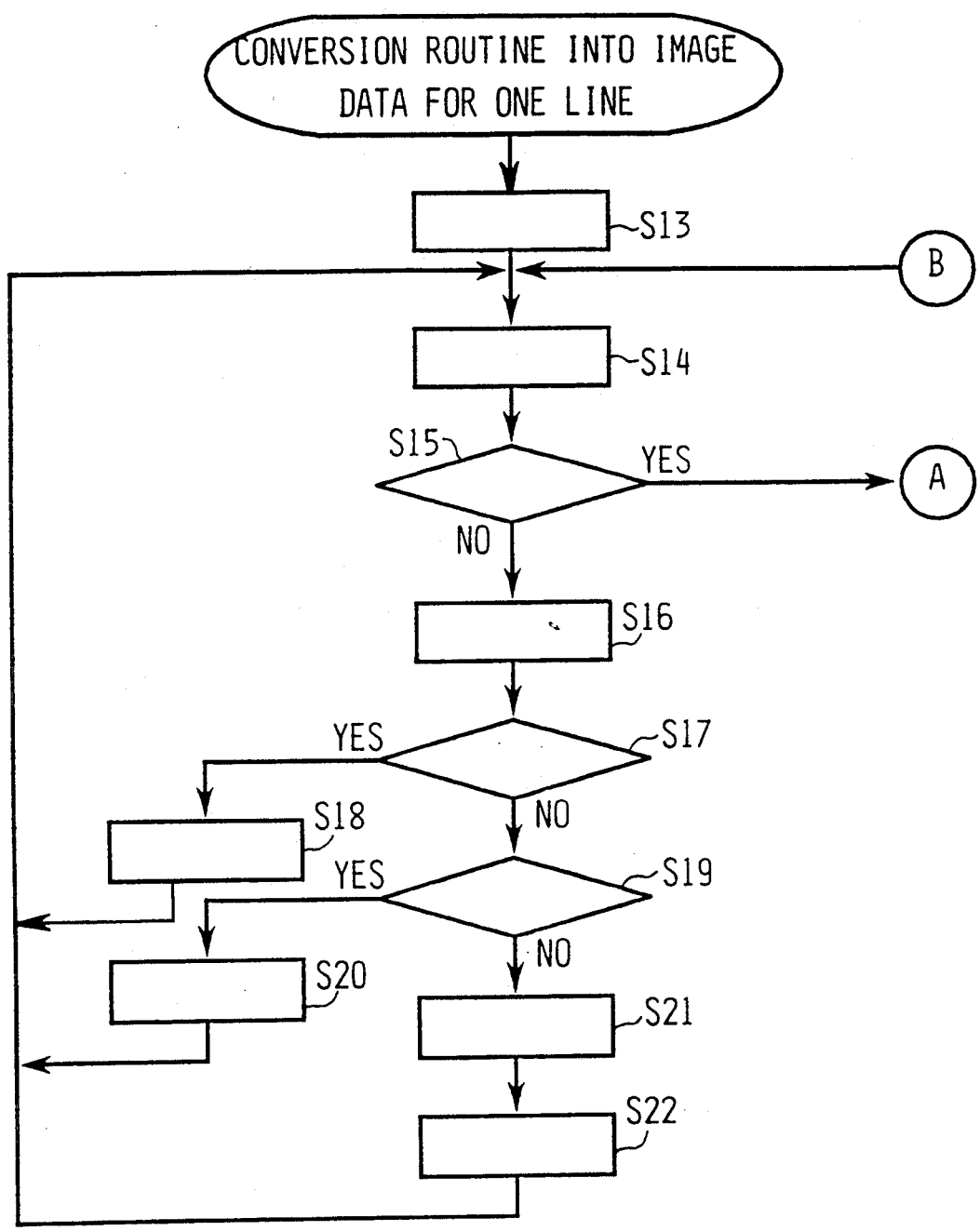
FIGS. 3A and 4A are flow charts showing a conversion routine into image data for one line.
Figure 4A:
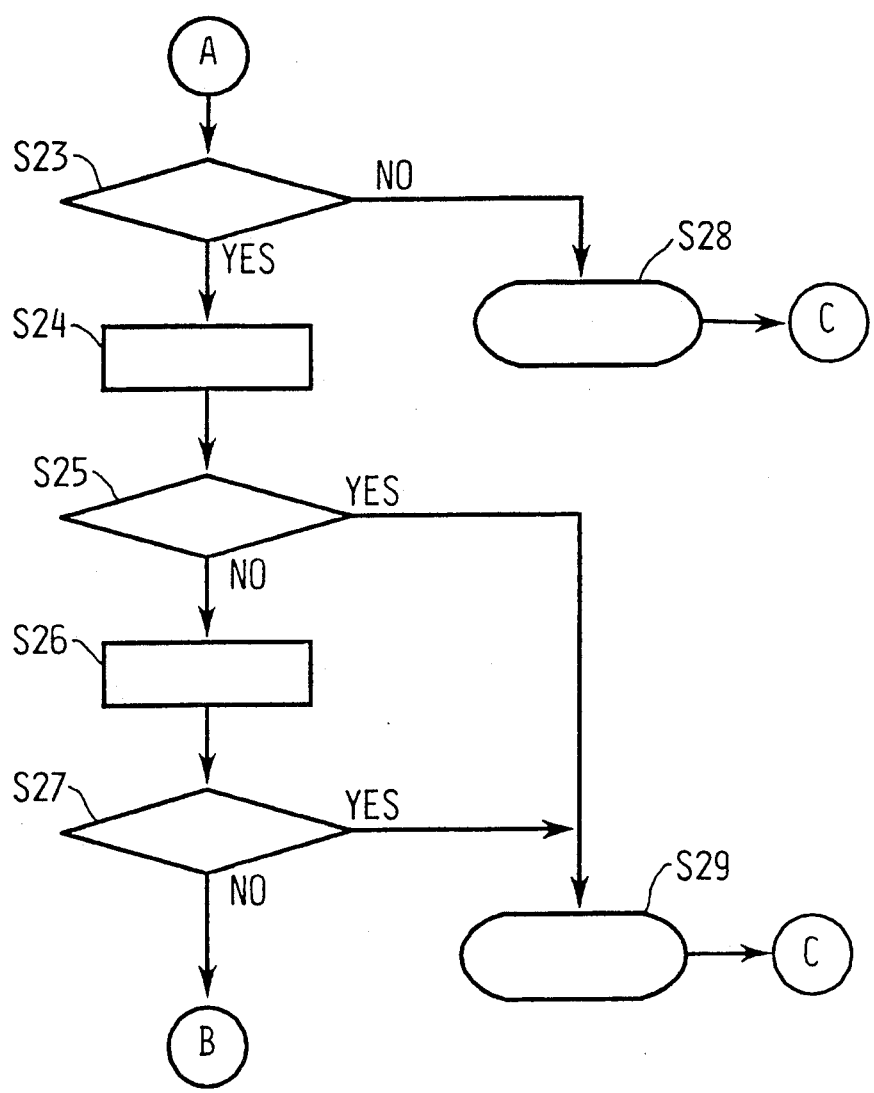

The operation of the embodiment as described above will be explained with reference to the flow charts of FIGS. 2A, 3A and 4A and the tables of FIGS. 2B, 3B and 4B.

Character codes and control codes supplied from the host computer 10 are received by the CPU 12, through the serial interface connecter and are stored one after another in the address of the received data buffer area 15A pointed to by a writing pointer of the received data buffer 15A.

Figure 2A:
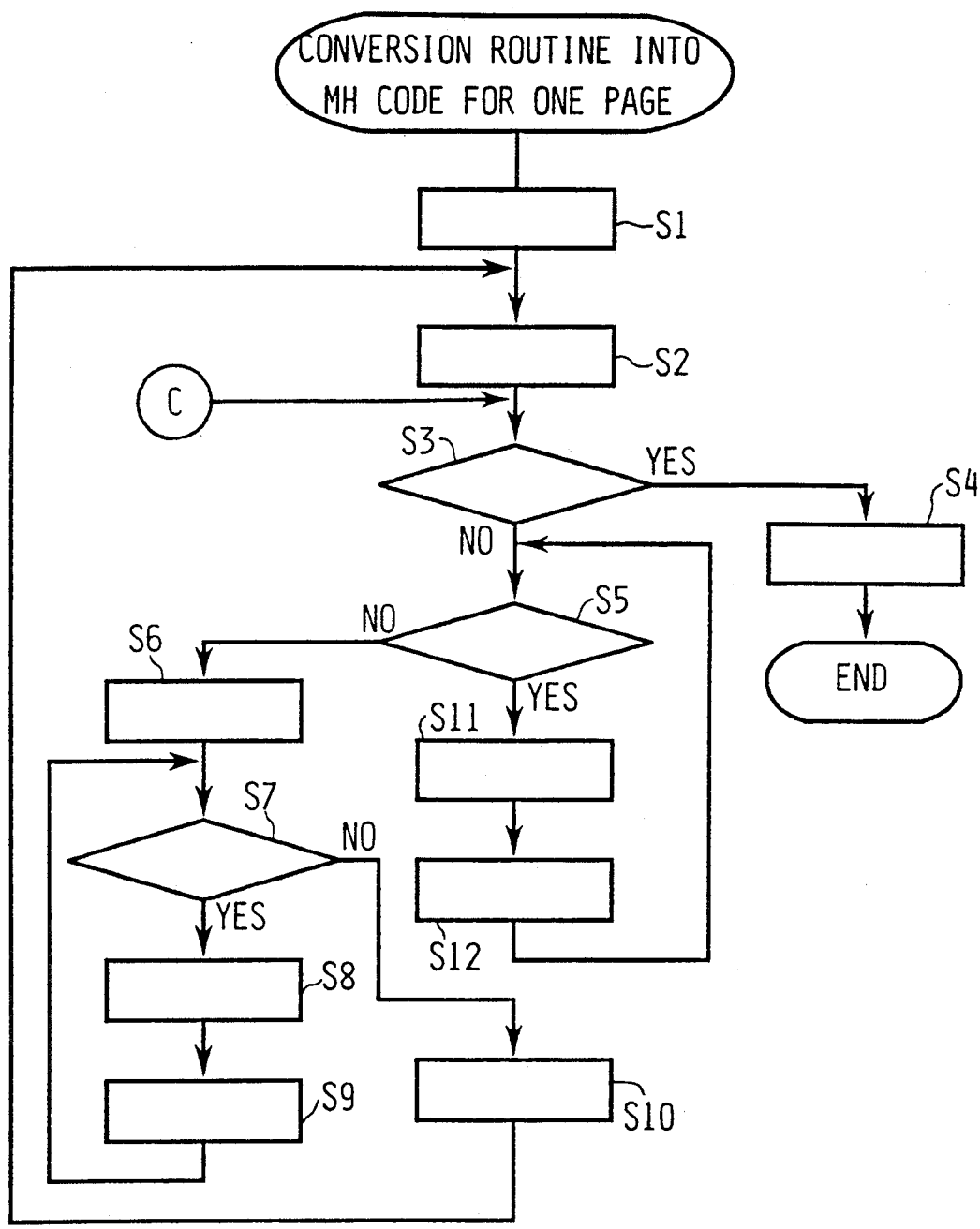

When the character codes and control codes are stored in the received data buffer area 15A, the process enters a routine of conversion from image data into MH code for one page, as shown in FIGS. 2A, 2B. At step S1, the image vertical position data area 15D, whose content is represented by IMGY, is initialized, i.e. IMGY=0; the MH coding vertical position data area 15E, whose content is represented by MHY, is initialized, i.e. MHY=0; the page length data area 15F, whose content is represented by PAGE, is initialized, i.e. PAGE=2240; and the line pitch amount data area 15G, whose content is represented by LINE, is initialized, i.e. LINE=32. In this embodiment, the number of rasters for one character are predetermined to be 28, the number of rasters of basic line pitch are predetermined to be 32, and line numbers of one page are predetermined to be 70. Thus number of rasters for one page are 32X70=2240.

Following step S1, the conversion process into image data for one line is carried out (step S2). The conversion routine into image data for one line will be described with reference to FIGS. 3A, 3B and 4A, 4B.

When the process starts the conversion routine from character and control codes into image data for one line, the image data buffer area 15B is initialized and the horizontal position data area 15I, whose content is represented by CPX, is initialized, i.e. CPX=0 (step S13).

Following step S13, the code stored in the received data buffer area 15A is read from the address pointed to by the read pointer (step S14). Then it is checked whether the read code is a page feed code or a line feed code (step S15). When it is determined that the read code is neither a page feed code nor a line feed code, the read pointer of the received data buffer area 15A is advanced (step S16). It is then checked whether the code read at step S14 is a line pitch control command "1" or not (step S17). If it is judged that the code is the line pitch control command "1", a value "32" is stored in the line pitch amount data area 15G, i.e. LINE=32 (step S18). If the judgement in step S17 is NO, then it is checked whether the code read at step S14 is a line pitch control command "2" or not (step S19). If it is judged that the code is the line pitch control command "2", then a value "48" is stored in the line pitch amount data area 15G, i.e. LINE=48 (step S20). This means that the line pitch amount is renewed by the line pitch control command "1" or the line pitch control command "2" at steps S18 or S20, respectively.

If the judgement in step S19 is NO, then the code read at step S14 is a character code, and, therefore, the character code is converted into image data by referring to the character font pattern ROM 14 and the converted image data is stored in the image data buffer area 15B (step S21). The CPX is renewed by having "1" added thereto (step S22). After step S22, the process beginning at step S14 is again carried out.

If the code initially read at step S14 is a page feed code or a line feed code, the result in step S15 is YES, and then it is checked whether CPX is "0" or not (step S23). As CPX is initialized at step S13 (CPX=0), and is renewed only by having "1" added thereto after the step S21, in which a character code is converted into image code, the fact that CPX is not "0" means that the conversion into image data has been carried out. Therefore, it may be concluded that conclusion information "0" is stored in the conclusion information storing area 15J and the conversion routine into image data for one line of character and control code is finished (step S28). In this case, the conversion routine into image data for one line is finished without executing the processes of steps S25, S26, S27 and S29, which correspond to the processes for the page feed code or the line feed code to be described later. However, as the read pointer of the received data buffer area 15A is not advanced, the same page feed code or the same line feed code previously read from data buffer area 15A is again used when the conversion routine into image data is carried out the next time.

If it is judged that CPX is "0" at step S23, the read pointer of the received data buffer area 15A is advanced (step S24). Then it is checked whether the code read at step S14 is a page feed code or not (step S25). If it is judged, at step S25, that the code is a page feed code, then conclusion information "1" is stored in the conclusion information storing area 15J and the conversion routine into image data for one line is finished. On the other hand, if it is judged, at step S25, that the code is not a page feed code, i.e. the code is a line feed code, IMGY is renewed, at step S26, by having added thereto the value of LINE, which was initialized at step S1 or renewed at steps S18 or S20.

Following step S26, it is checked whether or not IMGY+32>PAGE at step S27. If it is judged that IMGY+32 is greater than PAGE, i.e. if the result of step S27 is YES, that means the image conversion process for one page is concluded, and, therefore, the conclusion information "1" is stored in the conclusion information storing area 15J, and the image conversion routine for one page is concluded (step S29).

If it is judged, in step S27, that IMGY+32 is not greater than PAGE, i.e. if the result of step S27 is NO, then the process is repeated commencing with step S14 for the next input character or control code. Namely, if the next code is a code other than the page feed code or the line feed code, the read pointer of the received data buffer area 15A is renewed, if the next code is the line pitch amount control code, LINE is changed, and if the next code is the character code, it is converted into image data and CPX is renewed.

Referring back to FIGS. 2A, 2B, the conversion routine into MH code for one page will be explained. Following step S2, it is checked whether the conclusion information of the image conversion process, stored in the conclusion information storing area 15J, is "1" or not (step S3). If the conclusion information of the image feed is required. Therefore, if the result of step S3 is YES, a control return code RTC is stored in the MH code data buffer area 15C (step S4), and the conversion routine into MH code for one page is finished.

If it is judged, at step S3, that the conclusion information is "0", then it is checked, at step S5, whether or not MHY<IMGY. If the result of step S5 is NO, the raster counter area 15H, whose content is represented by C, is initialized at step S6, i.e. C=0, then it is checked that whether or not C<28 (step S7).

If the result of step S7 is YES, Cth raster of image data stored in the image data buffer area 15B is converted into MH code, and the converted MH code is stored in the MH code data buffer area 15C (step S8). Following step S8, C is renewed by having "1" added thereto (step S9), then the process returns to step S7 again. In this manner, all rasters for one line, i.e. 28 rasters in this embodiment, are converted into MH codes by the repetition of the steps S7, S8 and S9. When the conversion into MH codes of all rasters for one line is completed, the result of step S7 becomes NO, and the vertical raster position, which should be subjected to the conversion into MH code the next iteration, is renewed by having the value "28" added to the content, MHY, of the MH coding vertical position data area 15E (step S10). After the step S10, the process returns to step S2.

If it is judged that MHY<IMGY at step S5, then MH code data corresponding to one raster WHITE code, whose run-length is 1728 (A4 size), is stored in the MH code data buffer area 15C (step S11), then MHY is renewed by having "1" added thereto (step S12). The steps S5, S11 and S12 are repeated until MHY=IMGY.

Hereinafter, the process of the flow charts of this embodiment will be explained using an example. For this example, the series of character and control codes, output from the host computer 10 and stored in the received data buffer area 15A comprise codes in the order of "line pitch amount control command 1", "character code X", "character code Y", "line feed code", "character code Z" and "page feed code" (See FIG. 5).

First, as a result of the initializing at step S1, the content of each area in the RAM 15 is as follows; IMGY=0, MHY=0, PAGE=2240, and LINE=32. Then, the process proceeds to the image conversion routine for one line at step S2 and the image data buffer area 15B is initialized and CPX=0 is set at step S13.

At the following step S14, the first code "line pitch amount control code 1" is read from the received data buffer area 15A. As the result of that, the process proceeds to step S18 through steps S15, S16 and S17, and sets LINE=32 at step S18. The process then returns to step S14. Because the read pointer of the received data buffer area 15A is advanced each time the process goes through step S16, the code read at step S14 is the next code that was input from host computer 10.

Thus, the "character code X" is read at step S14. The process proceeds to step S21 through steps S15, S16, S17 and S19, and image data corresponding to the "character code X" is read from the character font pattern ROM 14 and is stored in the image data buffer area 15B. Then CPX is set to CPX=1 at step S22, as CPX had equalled 0, and the process returns to step S14.

When the "character code Y", the next character, is read at step S14, the same steps as for the "character code X" are followed. However, CPX becomes CPX=2, at step S22 as "1" has been added to the previous value of CPX.

The process returns to step S14 where the "line feed code" is read. As a result, in step S15 the judgment is YES, and the process proceeds to step S23. As CPX=2 at this time, the result of step S23 is NO, and the process proceeds to step S28 and sets the conclusion information "0" in the conclusion information storing area 15J. The read pointer of the received data buffer area 15A is not advanced after the "line feed code" is read from the received data buffer area 15A so that the read pointer keeps pointing out the same address where the "line feed code" is stored. The process then returns to step S3.

As the conclusion information is "0", the result of step S3 becomes NO, it is judged whether or not MHY<IMGY. So far, as MHY=0 and IMGY=0 were set at step S1, these values have not been renewed, so that the result of step S5 becomes NO and the processes of steps S7, S8 and S9 are repeated 28 times, i.e. the processes are repeated until all image data for the characters X and Y are converted into MH code. After that is completed, at step S10, MHY is set to MHY=28 by "28" being added to MHY=0.

The process then returns to step S2 where the process again proceeds to the conversion routine of character data and control data into image data at step S2, the image data buffer area 15B is again initialized and CPX is again set to CPX=0 at step S13. As the read pointer continues to point to the address of the "line feed code", the same "line feed code" is read from the received data buffer area 15A at the next step S14. As the result of that, the result of step S15 becomes YES and the process proceeds to step S23. As the CPX has not been renewed, or reset, after it was made CPX=0 at step S13, the result of step S23 is YES and the read pointer is advanced at the step S24. At this time, the read pointer designates the address of the "character Z". Since the code last read is the "line feed code", the result of the next step S25 is NO, and the value of LINE(=32) is added to IMGY(=0) at the step S26 and, therefore, IMGY=32. At this stage, since IMGY=32 and PAGE=2240, the result in step S27 is NO ((IMGY=32)+32)<2240) and the process returns to step S14 again.

At step S14 the "character code Z" is read out, and the image data corresponding to the "character code Z" is stored in the image data buffer area 15B in the same manner as the image data for "character code X" as explained above. Then, CPX is set to CPX=1 at step S22 and the process returns to step S14.

The "page feed code" is now read out at step S14, the result of step S15 becomes YES and the process proceeds to step S23. At this time CPX=1. Therefore, the result of step S23 is NO and the conclusion information "0" is stored in the conclusion information storing area 15J at step S28. Then the process proceeds to step S3. Because the read pointer of the received data buffer area 15A is not renewed after the "page feed code" was read out, the read pointer keeps pointing to the address where the "page feed code" is stored.

Next, as the conclusion information is "0" at this time, the result of step S3 is NO, and it is judged whether or not MHY<IMGY. According to the process so far, MHY was set to MHY=28 (step S10) and IMGY=32 (step S26), the result of step S5 is YES and, at the following step S11, MH code data corresponding to one raster of WHITE code of run-length "1728" is stored in the MH code data buffer area 15C. At the following step S12, "1" is added to MHY and the process returns to step S5. The series of steps S5, S11 and S12 is repeated four times until MHY=32. Accordingly, the MH code corresponding to four rasters of WHITE code are added following the MH code data corresponding to the image data of the characters X and Y, which were previously stored in the MH code data buffer area 15C.

When the value of MHY becomes "32", then the result of step S5 is NO, and the processes of steps S7, S8 and S9 are repeated until all of the image data for the character Z is converted into MH code, i.e. the processes are repeated 28 times. After that, at step S10, "28" is added to MHY and it becomes MHY=60.

The process then returns to the image conversion process of step S2 where the image data buffer area 15B is initialized and CPX is set equal to "0" again in step S13. Because the read pointer is still pointing to the address of the "page feed code", the "page feed code" is again read from the received data buffer area 15A at step S14. As the result, the judgment in step S15 becomes YES and the process proceeds to step S23. Since CPX has not been renewed since it was made CPX=0 at step S13, the result of step S23 is YES and the read pointer is advanced at step S24. Next, since the code which was last read is the "page feed code", the result of step S25 becomes YES, and the conclusion information "1" is stored in the conclusion information storing area 15J and the process proceeds to the step S3.

At this time, the result of step S3 is YES, and, therefore, control return code RTC is stored in the MH code data buffer area 15C at step S4 and the conversion into MH code for one page is finished.

To supplement the example above, the series of processes of the steps S5, S11 and S12 are further explained. After the process at step S10, the content MHY represents the raster position of a line of image data which is subjected to the conversion into MH code the next time such a conversion takes place. In other words, it represents the raster position of the raster immediately after the very last raster of characters X and Y whose conversion into MH code has been completed. On the other hand, the content IMGY represents the uppermost raster position of the character Z of the second line that should be subjected to the conversion into MH code the next time such a conversion takes place. Namely, the rasters from 28th raster, represented by MHY, to the raster which is one raster before the 32nd raster, represented by IMGY, correspond to a space where there exists no image data, i.e. a space between the lines which, in this case, is equal to four rasters. Therefore, storing the MH code data representing WHITE run-code directly in the MH code data buffer area 15C, while increasing MHY to become equal to IMGY by the series of steps S5, S11 and S12, means that the space between the lines is converted directly into MH code without being converted into image data.

Figure 5:
FIG. 5 shows one example of the series of codes stored in a received data buffer area.

In case where the leading code, out of the codes illustrated in FIG. 5, is the "line pitch control command 2", then LINE becomes LINE=48, since step S17 is NO and step S19 is YES to result in LINE=48 at step S20. The value of LINE(=48) is added to IMGY(=0) at step S26, and, therefore, the series of processes of steps S5, S11 and S12 is repeated-20 times until it becomes MHY=48. According to that, 20 rasters of WHITE code are added after the MH code corresponding to the characters X and Y. In this case, 20 rasters of spaces corresponding to the space between the lines are converted directly into MH code without the conversion into the image data.

As is obvious from the above description, the space amount is determined by the values of IMGY and MHY. Therefore, it can be regarded that the image vertical position data area 15D and the MH coding vertical position data area 15E, in which IMGY and MHY are stored, respectively, substantially memorize the space between the lines. Also, it can be regarded that the line pitch amount data area 15G, in which LINE is stored, substantially memorizes the space between the lines, since IMGY is renewed, at step S26, by being added thereto the value of LINE.

Although, in this embodiment, one example, in which two sizes of line pitch are used, is described, it is possible to provide various line pitches by increasing the number of line pitch control commands and by increasing the number of corresponding line data. Specifically, this is achieved by inserting additional steps like judging steps S17 and S19 in the image conversion routine for line pitch amount control by adding corresponding steps like S18 and S20 having different line pitch amounts. Thus, a fine line pitch control such as one, in which one raster is made as a minimum line space, can be achieved by using a LINE=29.

As described above, according to the present invention, after the conversion into MH code of the image data for one character line is complete, MH code corresponding to WHITE code for the amount of space between lines is added to follow the MH code for the one character line. Therefore it is not necessary to include space data for the line space in the character font pattern memory and the capacity of the character font pattern memory can be reduced. Also, as the MH code corresponding to the line space is directly added without the conversion into image data to form the line space, there is an advantage in that the conversion time is reduced since it is not necessary for the line space to be converted from image data into MH code. Further, substantially any line space amount can be adopted by subdividing the line space data stored in the memory.

In addition, if the host computer itself had to add the MH code corresponding to WHITE code for the line space following to the MH code for each character line, after the conclusion of the conversion into image data for the one character line, the burden on the host computer would become heavier. The invention saves the host computer from such a burden.

What is claimed is:

1. A facsimile data processing apparatus connectable to a host computer, comprising:
   first conversion means for receiving printer control code and character code from the host computer and for converting characters corresponding to the received character code into image data;

second conversion means for converting the converted image data into transmission code;

memory means for memorizing line space amount;

code adding means for adding white code, corresponding to the line space amount, stored in said memory means, following said transmission code converted from the image data of one character line; and detecting means for detecting the conclusion of the conversion from image data for one character line into said transmission code, wherein said code adding means adds said white code based on the detection by said detecting means.

2. The facsimile data processing apparatus as claimed in claim 1, further comprising a font pattern memory wherein the pattern dot data is limited to the pattern solely and contains no spacing dot data at upper and lower portions.

3. The facsimile data processing apparatus as claimed in claim 1, wherein said apparatus includes a central processing unit independent from said host computer.

4. The facsimile data processing apparatus as claimed in claim 1, wherein said printer control codes include a plurality of line pitch control codes, and wherein said memory means memorize the line space amount corresponding to said plurality of line pitch control codes, whereby the amount of white code added by said code adding means varies based on the line pitch control codes.

5. The facsimile data processing apparatus as claimed in claim 1, wherein said transmission code is modified Huffman code.

6. The facsimile data processing apparatus as claimed in claim 1, wherein said memory means memorizes the line space amount as the difference between the raster number of the line pitch and the raster number of one line of image data.

7. The facsimile data processing apparatus as claimed in claim 1, further comprising imaging vertical position storing means for storing the uppermost raster of the one line image data to be subjected to the conversion into transmission code, and coding vertical position storing means for storing a vertical raster position to be subjected to the conversion into transmission code at the next time.

8. The facsimile data processing apparatus as claimed in claim 7, wherein said code adding means adds said white code until reaching the vertical raster position indicated by said imaging vertical position storing means following the converted code for one character line.

9. A facsimile data processing apparatus usable with a host computer, comprising:

a central processing unit;

a first conversion means for converting character data from the host computer into image data;

a second conversion means for converting the image data into transmission code;

a line space creation means for generating spacing between lines directly as transmission code, wherein said central processing unit controls said first and second conversion means and said line space creation means; and detecting means for detecting the conclusion of the conversion of one line of image data into transmission code, wherein said line space creation means adds the transmission code corresponding to a space between lines at the end of each line of converted transmission code.

10. The facsimile data processing apparatus as claimed in claim 9, wherein a control code may be entered from the host computer to change a size of the spacing between lines that is converted into transmission code by said line space creation means.

* * * * *